(12) United States Patent
Ghosh et al.

(10) Patent No.: US 11,734,321 B2
(45) Date of Patent: Aug. 22, 2023

(54) METHOD AND SYSTEM FOR RETRIEVAL OF PRIOR COURT CASES USING WITNESS TESTIMONIES

(71) Applicant: Tata Consultancy Services Limited, Mumbai (IN)

(72) Inventors: Kripabandhu Ghosh, Pune (IN); Sachin Sharad Pawar, Pune (IN); Girish Keshav Palshikar, Pune (IN); Pushpak Bhattacharyya, Patna (IN); Vasudeva Varma Kalidindi, Hyderabad (IN)

(73) Assignee: Tata Consultancy Services Limited, Mumbai (IN)

( * ) Notice: Subject to any disclaimer, the term of this patent is extended or adjusted under 35 U.S.C. 154(b) by 321 days.

(21) Appl. No.: 17/206,201

(22) Filed: Mar. 19, 2021

(65) Prior Publication Data

US 2022/0067076 A1 Mar. 3, 2022

(30) Foreign Application Priority Data

Sep. 2, 2020 (IN) .............................. 202021037850

(51) Int. Cl.
*G06F 16/332* (2019.01)
*G06F 16/33* (2019.01)
(Continued)

(52) U.S. Cl.
CPC ...... *G06F 16/3329* (2019.01); *G06F 16/3344* (2019.01); *G06F 18/214* (2023.01);
(Continued)

(58) Field of Classification Search
None
See application file for complete search history.

(56) References Cited

U.S. PATENT DOCUMENTS 10,133,755 B2 11/2018 Carothers et al.
2016/0140210 A1* 5/2016 Pendyala .............. G06F 40/205
707/737
(Continued)

FOREIGN PATENT DOCUMENTS

CN 107122438 A 9/2017
CN 107807962 A 3/2018
(Continued)

OTHER PUBLICATIONS

Tao Dai, Li Zhu, Yaxiong Wang, and Kathleen M. Carley; Attentive Stacked Denoising Autoencoder With Bi-LSTM for Personalized Context-Aware; Oct. 28, 2019 URL: https://ieeexplore.ieee.org/document/8884121 (Year: 2019).*
(Continued)

*Primary Examiner* — Richa Mishra
(74) *Attorney, Agent, or Firm* — Finnegan, Henderson, Farabow, Garrett & Dunner, LLP

(57) ABSTRACT

This disclosure relates generally to retrieval of prior court cases using witness testimonies. Conventional state-of-the-art methods use supervised techniques for answering basic questions in legal domain using numerous features and do not address interpretability of results and the performance and precision of retrieving prior court cases for these methods are less. Embodiments of the present disclosure obtains an embedded representation for an event structure of a user query and testimony sentences identified from prior court cases using a trained Bi-LSTM classifier and a set of linguistic rules. A similarity is estimated between the embedded representation for the event structure of the user query and the event structure of each testimony sentence from the prior court cases. Further a relevance score is assigned in accordance with the estimated similarity to retrieve the relevant prior court cases. The disclosed method
(Continued)

is used to retrieve the relevant prior court cases using witness testimonies.

11 Claims, 5 Drawing Sheets

(51) Int. Cl.
    *G06F 40/253* (2020.01)
    *G06Q 50/18* (2012.01)
    *G06N 3/08* (2023.01)
    *G06F 18/214* (2023.01)
    *G06N 3/044* (2023.01)

(52) U.S. Cl.
    CPC ........... *G06F 40/253* (2020.01); *G06N 3/044* (2023.01); *G06N 3/08* (2013.01); *G06Q 50/18* (2013.01)

(56) References Cited

U.S. PATENT DOCUMENTS

| | | | |
|---|---|---|---|
| 2020/0210491 A1* | 7/2020 | Hajic | G06F 40/211 |
| 2020/0250212 A1* | 8/2020 | Macartney | G06F 16/3328 |
| 2022/0121695 A1* | 4/2022 | Zhang | G06F 40/40 |

FOREIGN PATENT DOCUMENTS

| | | |
|---|---|---|
| CN | 109117434 A | 1/2019 |
| CN | 110275936 A | 9/2019 |

OTHER PUBLICATIONS

Anurag Pallaprolu, Radha Vaidya, Aditya Attawar; Challenges and Thrills of Legal Arguments; Jun. 6, 2020 URL: https://arxiv.org/pdf/2006.03773.pdf (Year: 2020).*

Dragoni et al., "Combining NLP Approaches for Rule Extraction from Legal Documents," First Workshop on Mining and Reasoning with Legal Texts (2016).

Sugathadasa et al., "Legal Document Retrieval using Document Vector Embeddings and Deep Learning," First Workshop on Mining and Reasoning with Legal Texts (2018).

* cited by examiner

METHOD AND SYSTEM FOR RETRIEVAL OF PRIOR COURT CASES USING WITNESS TESTIMONIES

PRIORITY CLAIM

This U.S. patent application claims priority under 35 U.S.C. § 119 to Indian provisional patent application no. 202021037850, filed on Sep. 2, 2020.

TECHNICAL FIELD

The disclosure herein generally relates to information retrieval, and, more particularly, to method and system for retrieval of prior court cases using witness testimonies.

BACKGROUND

Witness testimonies and their cross-examinations by the counsels have a significant effect on the decision of judges. Large corpora of court judgements (e.g., the Indian Supreme and High Court judgements), often contain the judges' summaries of the witness testimonies presented during the proceedings. Judges often comment in a judgement on (a) the correctness, quality, completeness and reliability of the testimonies of a witness; (b) the interrelationships between the testimonies of various witnesses (e.g., consistency or contradictions); and (c) the impact ("weighing in") of various witness testimonies on the Judges' final decision. The specific contents of witness testimonies and such high-level analyses are valuable for preparing a court case, retrieving relevant past court cases, understanding strengths and weaknesses of a case, predicting court decisions, and extracting legal argumentation.

For retrieving prior court cases, several state-of-the-art methods consider whole case document itself. The state-of-the-art methods for court case retrieval such as Best Matching 25 (BM25), Document to Vector (Doc2Vec) and Sentence-Bidirectional Encoder Representations from Transformers (Sentence-BERT) shows less precision on fine grained queries. These methods use supervised techniques for answering basic questions in legal domain using numerous features. However, the methods do not address interpretability of results and the performance and precision of retrieving prior court cases for these methods are less.

SUMMARY

Embodiments of the present disclosure present technological improvements as solutions to one or more of the above-mentioned technical problems recognized by the inventors in conventional systems.

In an aspect, there is provided a processor implemented method for retrieval of prior court cases using witness testimonies. The method comprises: receiving, via one or more hardware processors, a user query for retrieving one or more prior court cases, wherein the one or more prior court cases comprise a set of testimony sentences and a set of non-testimony sentences, wherein the user query and each testimony sentence of the set of testimony sentences comprise an event structure with a predicate and one or more arguments; obtaining an embedded representation for the event structure of the user query, using a trained denoising auto-encoder executed via the one or more hardware processors, wherein the denoising auto-encoder is trained using one or more testimony sentences from the set of testimony sentences wherein the one or more testimony sentences are identified using a trained classifier and a set of linguistic rules; estimating, via the one or more hardware processors, a similarity between the obtained embedded representation of the user query and an embedded representation of each of the one or more testimony sentences using a similarity function; assigning a relevance score, via the one or more hardware processors, to the one or more prior court cases associated with the one or more testimony sentences in accordance with the estimated similarity; and retrieving a predefined number of prior court cases out of the one or more prior court cases, wherein the predefined number is decided based on the assigned relevance score.

In another aspect, there is provided a system for retrieval of prior court cases using witness testimonies. The system comprises: memory storing instructions; one or more communication interfaces; and one or more hardware processors coupled to the memory via the one or more communication interfaces, wherein the one or more hardware processors are configured by the instructions to: receive a user query for retrieving one or more prior court cases, wherein the one or more prior court cases comprise a set of testimony sentences and a set of non-testimony sentences, wherein the user query and each testimony sentence of the set of testimony sentences comprise an event structure with a predicate and one or more arguments; obtain an embedded representation for the event structure of the user query, using a trained denoising auto-encoder wherein the denoising auto-encoder is trained using one or more testimony sentences from the set of testimony sentences wherein the one or more testimony sentences are identified using a trained classifier and a set of linguistic rules; estimate a similarity between the obtained embedded representation of the user query and an embedded representation of each of the one or more testimony sentences using a similarity function; assigning a relevance score to the one or more prior court cases associated with the one or more testimony sentences in accordance with the estimated similarity; and retrieve a predefined number of prior court cases out of the one or more prior court cases, wherein the predefined number is decided based on the assigned relevance score.

In an embodiment, the trained classifier is trained using a set of training data, wherein the set of training data comprises of (i) the set of testimony sentences satisfying a set of predefined linguistic rules, (ii) the set of non-testimony sentences satisfying a subset of the set of predefined linguistic rules and (iii) a set of sentences which are neither identified as testimony nor non-testimony by the linguistic rules.

In an embodiment, training the denoising auto-encoder, comprises: (i) encoding the event structure by masking either the predicate or one or more arguments of the event structure of each of the one or more testimony sentences; (ii) reconstructing the embedded representation of the encoded event structure of each of the one or more testimony sentences; and (iii) storing the embedded representation of each of the one or more testimony sentences in the database.

In an embodiment, the similarity function is a maximum cosine similarity function between the embedded representation of the user query and the one or more testimony sentences.

In an embodiment, the identified one or more testimony sentences and the one or more non-testimony sentences are stored in a database.

In an embodiment, the set of predefined linguistic rules satisfied by the set of testimony sentences are: (i) presence of explicit or implicit witness mentions wherein the implicit mentions is any one of (a) pronouns (b) person-indicating common nouns (c) actual person names, (ii) presence of at least one statement-indicating verb, (iii) dependency subtree rooted at the at least one statement indicating verb should contain at least one of the following: a clausal complement or open clausal complement, (iv) the statement verb should not have a child which negates itself, and (v) the statement verb should have at least one witness mention within its subject or agent dependency subtree but should not have any legal role mention within its subject or agent dependency subtree.

In an embodiment, the subset of the set of predefined linguistic rules satisfied by the set of non-testimony sentences are (i) presence of at least one statement-indicating verb, (ii) dependency subtree rooted at the at least one statement indicating verb should contain at least one of the following: a clausal complement or open clausal complement, (iii) the statement verb should have at least one legal role mention within its subject or agent dependency subtree.

In yet another aspect, there are provided one or more non-transitory machine readable information storage mediums comprising one or more instructions which when executed by one or more hardware processors causes at least one of: receiving a user query for retrieving one or more prior court cases, wherein the one or more prior court cases comprise a set of testimony sentences and a set of non-testimony sentences, wherein the user query and each testimony sentence of the set of testimony sentences comprise an event structure with a predicate and one or more arguments; obtaining an embedded representation for the event structure of the user query, using a trained denoising auto-encoder wherein the denoising auto-encoder is trained using one or more testimony sentences from the set of testimony sentences wherein the one or more testimony sentences are identified using a trained classifier and a set of linguistic rules; estimating a similarity between the obtained embedded representation of the user query and an embedded representation of each of the one or more testimony sentences using a similarity function; assigning a relevance score to the one or more prior court cases associated with the one or more testimony sentences in accordance with the estimated similarity; and retrieving a predefined number of prior court cases out of the one or more prior court cases, wherein the predefined number is decided based on the assigned relevance score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION OF EMBODIMENTS

Figure 1:
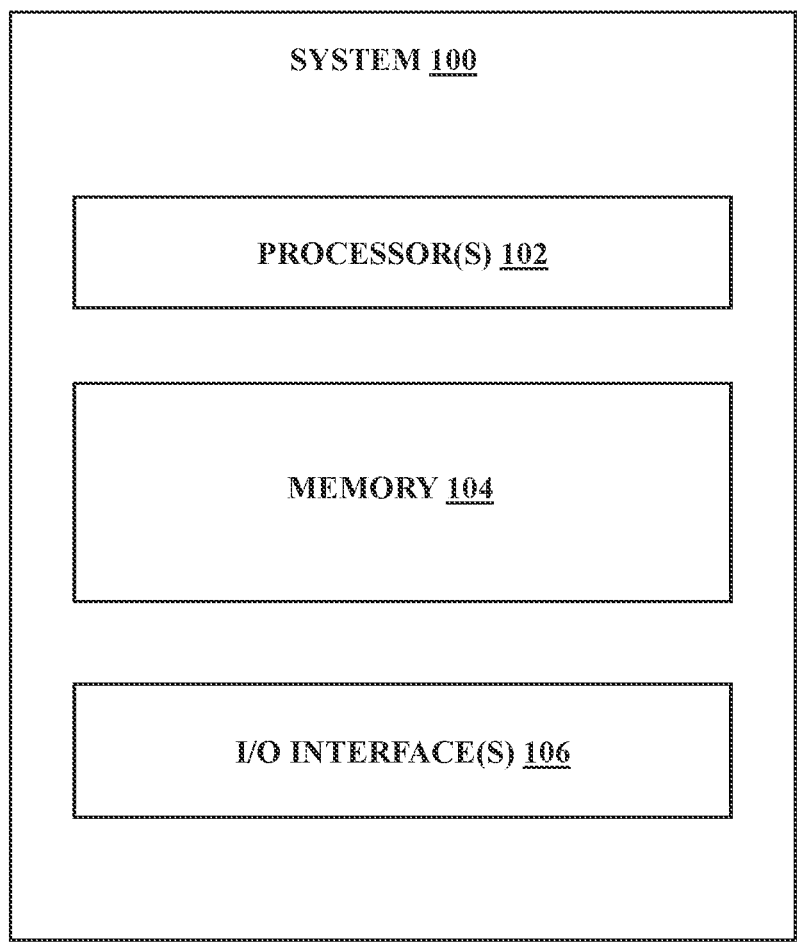
FIG. 1 illustrates an exemplary block diagram of a system for retrieval of prior court cases using witness testimonies, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following embodiments described herein.

Witnesses are important in all types of court cases whether it is prosecution or defense, lay or expert. Witness testimonies are important constituents of a court case description and play a significant role in the final decision. Witness testimonies have a significant effect on judges' decision. The contents of witness testimonies are valuable for retrieving relevant prior court cases. A witness testimony provides factual or subjective details about various events, objects and persons. Witness testimonies of court cases comprises events corresponding to its court case. An event of witness testimony may be a physical action or communication. There are several types of events in a witness testimony, such as crime events, legal events and so on. Events may be expressed as verbs. The event verbs are identified using MatePlus tool. However, nouns (for example: attack) may also denote events. The event information is represented as an event frame wherein the event frame (structure) comprises of (i) an action verb, (ii) an agent who initiated the action, and (iii) a patient (or beneficiary) who experienced the action. Event structure comprises a predicate and arguments. The predicate and associated A0, A1 arguments may be identified using state-of-the-art methods to represent event structure.

In an embodiment, the witness testimony may be alternatively referred as testimony sentence or interchangeably herewith.

Referring now to the drawings, and more particularly to FIG. 1 through FIG. 4B, where similar reference characters denote corresponding features consistently throughout the figures, there are shown preferred embodiments and these embodiments are described in the context of the following exemplary system and/or method.

FIG. 1 illustrates an exemplary block diagram of a system 100 for retrieval of prior court cases using witness testimonies, in accordance with some embodiments of the present disclosure. In an embodiment, the system 100 includes one or more processors 102, communication interface device(s) or input/output (I/O) interface(s) 106, and one or more data storage devices or memory 104 operatively coupled to the one or more processors 102. The one or more processors 102 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, hand-held devices, workstations, mainframe computers, servers, a network cloud and the like.

The I/O interface (s) 106 may include a variety of software and hardware interfaces, for example, a web interface, a graphical user interface, and the like and can facilitate multiple communications within a wide variety of networks and protocol types, including wired networks, for example, LAN, cable, etc., and wireless networks, such as WLAN, cellular, or satellite. In an embodiment, the I/O interface(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system for retrieval of prior court cases using witness testimonies may be stored in the memory 102.

Figure 2:
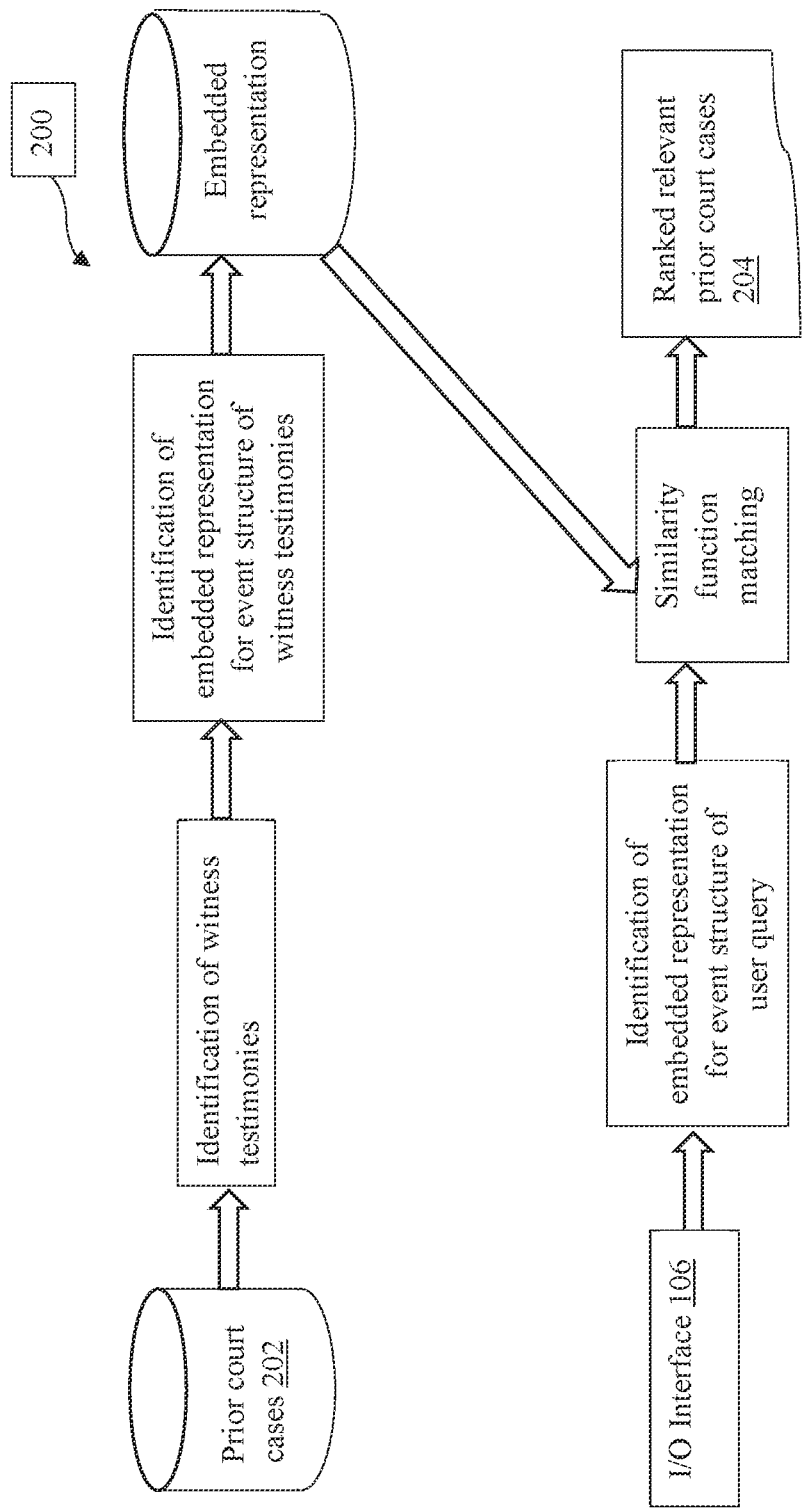
FIG. 2 is a schematic flow diagram of a method for retrieval of prior court cases using witness testimonies according to some embodiments of the present disclosure.

FIG. 2 is a schematic diagram 200 of a method for retrieval of prior court cases using witness testimonies according to some embodiments of the present disclosure. A detailed description of the method for retrieval of prior court cases using witness testimonies is explained later in conjunction with FIG. 3 through FIG. 4B.

In an embodiment of the present disclosure, the prior court cases 202 are stored in database (not shown in FIG. 2) residing inside the memory 102. Further, witness testimony sentences are identified from the prior court cases 202 using a trained classifier and a set of linguistic rules. An event structure associated with the witness testimony sentences are identified and further an embedded representation for the event structure of the witness testimonies are stored in a database. Further a user query is received through the I/O interface 106 for which relevant prior court cases needs to be identified. An event structure for the user query is identified and further an embedded representation for the event structure of the user query is estimated. Further a similarity function matching is performed between the embedded representation of the user query and the testimony sentences associated with the prior court cases by estimating a similarity. Ranking of the prior court cases are performed in accordance with the similarity to obtain ranked relevant prior court cases 204.

Figure 4A:
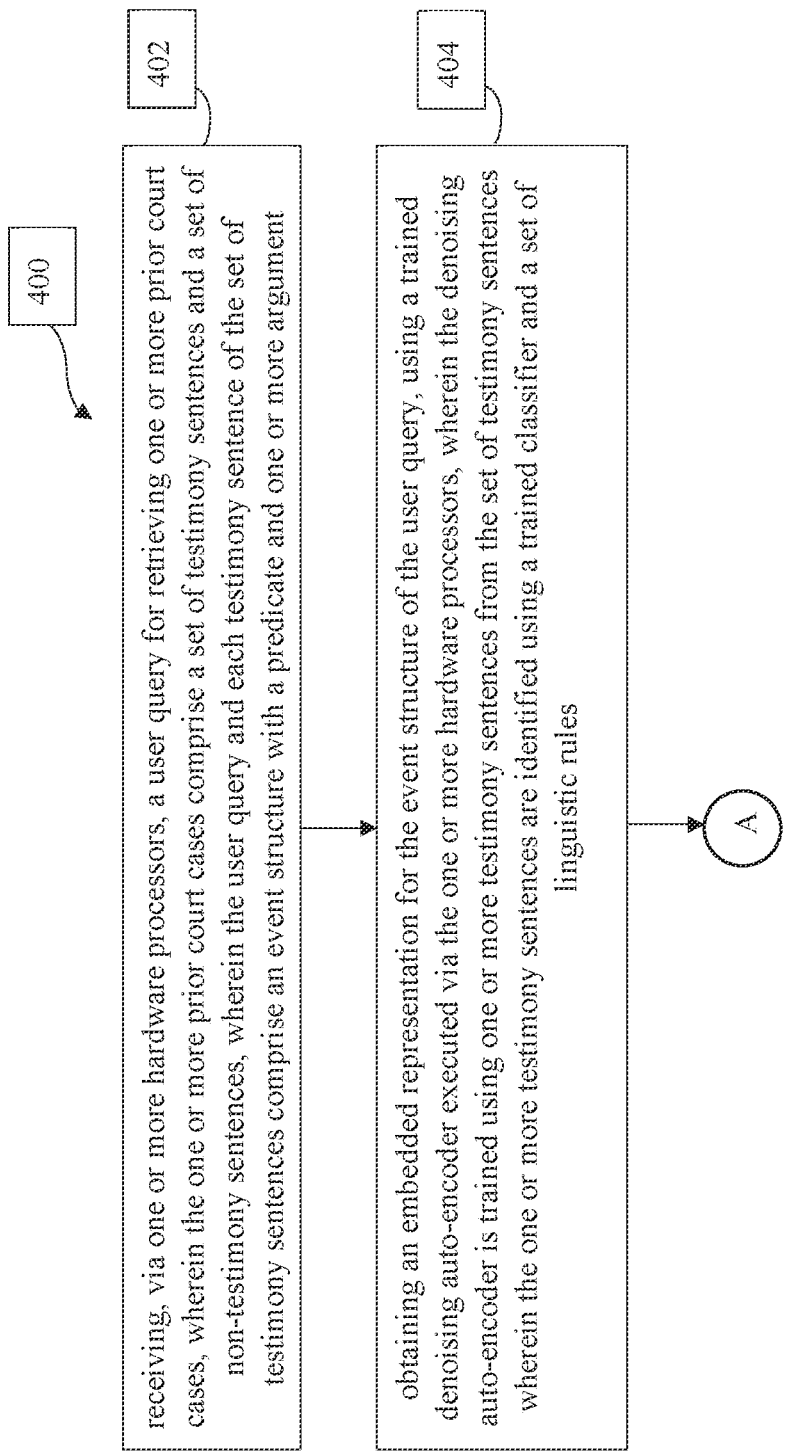
FIG. 4A and FIG. 4B illustrate an exemplary flow diagram of a computer implemented method for retrieval of prior court cases using witness testimonies, in accordance with some embodiments of the present disclosure.
Figure 4B:
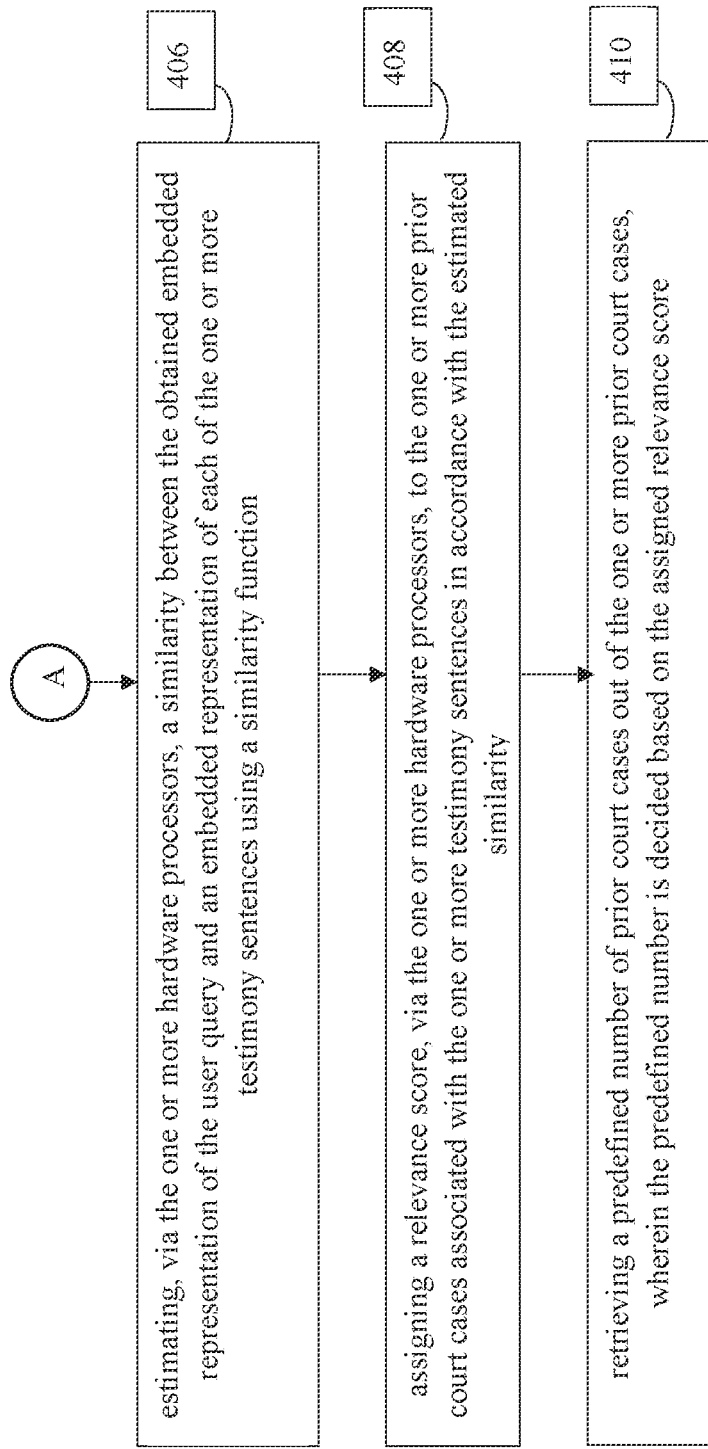

FIG. 4A and FIG. 4B illustrate an exemplary flow diagram of a computer implemented method 400 for retrieval of prior court cases 202 using witness testimonies, in accordance with some embodiments of the present disclosure. In an embodiment, the system 100 comprises one or more data storage devices or the memory 104 operatively coupled to the one or more hardware processors 102 and is configured to store instructions for execution of steps of the method by the one or more processors 102. The steps of the method 400 of the present disclosure will now be explained with reference to components of the system 100 of FIG. 1.

In an embodiment of the present disclosure, the retrieval of prior court cases using witness testimonies is explained with reference to the steps of the method 400 of FIG. 4A and FIG. 4B. In an embodiment, the one or more processors 102 are configured to receive at step 402, a user query for retrieving one or more prior court cases, wherein the one or more prior court cases comprise a set of testimony sentences and a set of non-testimony sentences, wherein the user query and each testimony sentence of the set of testimony sentences comprise an event structure with a predicate and one or more arguments. The user query for identifying prior court cases may be high-level English queries asked by a lawyer or a lay person. Large corpora of court judgements (e.g., the Indian Supreme and High Court judgements) containing the judges' summaries of the witness testimonies presented during the proceedings are considered. The prior court cases form the backbone of judicial systems following Common Law. The prior court cases comprise testimony sentences and non-testimony sentences. An example of a testimony sentence in a prior court case for identifying relevant prior court case is The body of Gian Kaur was sent to Dr. Singh (Prosecution Witness (PW) 6) for post-mortem who noticed five minor injuries on the body of the deceased. The user query and each testimony sentence comprise the event structure. A semantic role labeling tool is used to identify the predicate and associated arguments A0, A1 for the event structure of the user query and the testimony sentences.

Figure 3:
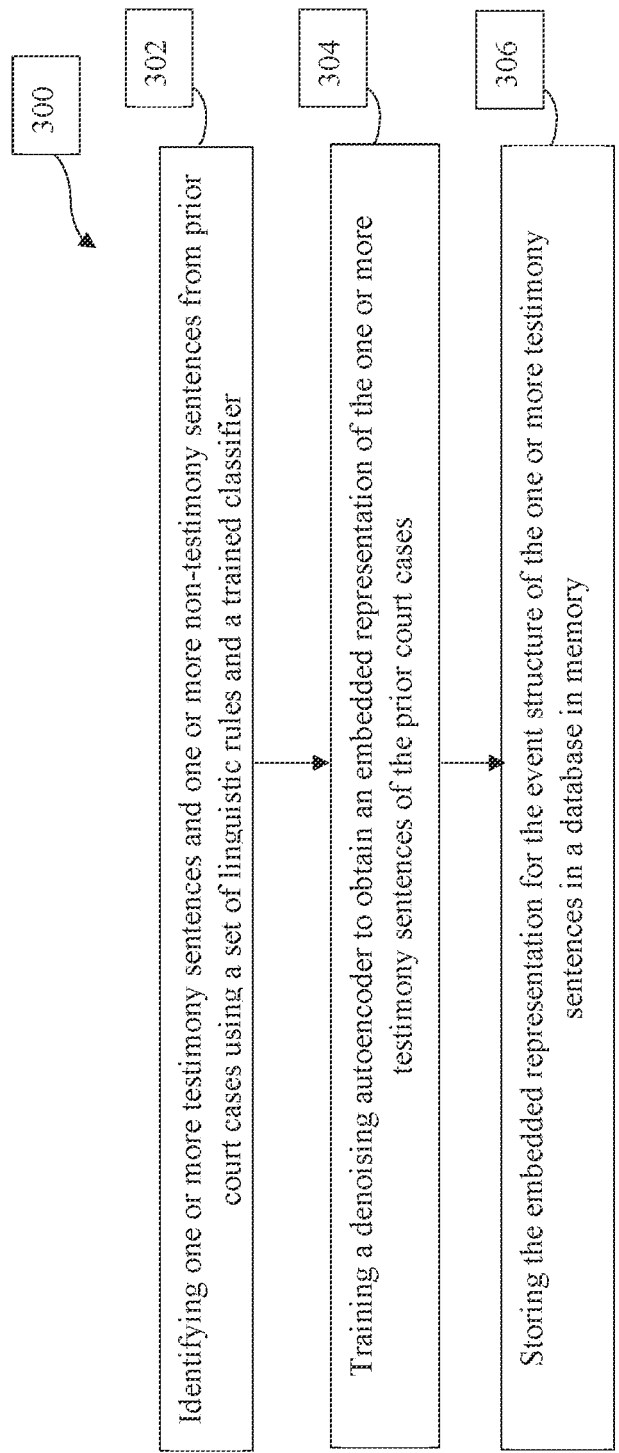
FIG. 3 illustrates an exemplary flow diagram for obtaining an embedded representation for event structure of witness testimonies of prior court cases, in accordance with some embodiments of the present disclosure.

In an embodiment of the present disclosure, the one or more processors 102 are configured to obtain at step 404, an embedded representation for the event structure of the user query, using a trained denoising auto-encoder executed via the one or more hardware processors, wherein the denoising auto-encoder is trained using one or more testimony sentences from the set of testimony sentences wherein the one or more testimony sentences are identified using a trained classifier and a set of linguistic rules. The training of the denoising auto-encoder to obtain embedded representation for the event structure of the one or more testimony sentences is explained with reference to FIG. 3. FIG. 3 illustrates an exemplary flow diagram for obtaining the embedded representation for event structure of testimony sentences of prior court cases, in accordance with some embodiments of the present disclosure. At step 302 of 300, the one or more processors 102 are configured to identify one or more testimony sentences and one or more non-testimony sentences from prior court cases using a set of linguistic rules and a trained classifier. The set of linguistic rules are used initially to identify testimony sentences and non-testimony sentences automatically, as there are no readily available annotated datasets for testimony sentences. Further the identified testimony and non-testimony sentences from the set of linguistic rules are provided to a trained Bidirectional long short term memory (Bi-LSTM) based sentence classifier to identify the one or more testimony sentences.

In an embodiment, the set of linguistic rules to identify testimony sentences are given as below:
  (i) presence of explicit (for example: eye-witness, P.W.2) or implicit witness mentions wherein the implicit mentions is any one of (a) pronouns (for example: he, she) (b) person-indicating common nouns (for example: landlord, doctor) (c) actual person names (for example: S. I. Patil),
  (ii) presence of at least one statement-indicating verb (for example: stated, testified, narrated),
  (iii) dependency subtree rooted at the at least one statement indicating verb should contain at least one of the following: a clausal complement or open clausal complement,
  (iv) the statement verb should not have a child which negates itself (for example: not), and (v) the statement verb should have at least one witness mention within its subject or agent dependency subtree but should not have any legal role (for example: lawyer, counsel, judge), mention within its subject or agent dependency subtree.

In another embodiment, the set of linguistic rules to identify non-testimony sentences are given as below:
(i) presence of at least one statement-indicating verb,
(ii) dependency subtree rooted at the at least one statement indicating verb should contain at least one of the following: a clausal complement or open clausal complement,
(iii) the statement verb should have at least one legal role mention within its subject or agent dependency subtree.

The testimony sentences and non-testimony sentences identified using the linguistic rules are used for training the Bi-LSTM based sentence classifier for further classification of testimony sentences and non-testimony sentences. Since the linguistic rules are dependent on achieving correct dependency parsing, they fail to identify several testimony sentences due to incorrect parsing. The Bi-LSTM based sentence classifier does not use any dependency information but uses only the sequence information of words in a sentence. For training the Bi-LSTM classifier, a training dataset was created automatically by using the linguistic rules. 37572 Testimony sentences and 14382 non-Testimony sentences identified by the linguistic rules are treated as positive and negative instances, respectively. In addition, 23190 sentences are randomly selected from the rest of the corpus of prior court cases and treated as negative instances. The Bi-LSTM classifier is trained using these testimony and non-testimony sentences. Once the Bi-LSTM classifier is trained, all the remaining sentences in the corpus is classified. 10000 sentences with highest confidence is selected as testimony sentences. The precision of supervised Bi-LSTM classifier is verified manually by using 200 random sentences out of these 10000 and the precision turned out to be 75%. Table 1 shows an example of testimony sentences identified by the linguistic rules and the Bi-LSTM classifier. In Table 1 S1 and S2 are testimony sentences identified by the linguistic rules, S3 are negative instance identified by the linguistic rules for testimony sentences; S4 are testimony sentence NOT identified by the linguistic rules but identified by the Bi-LSTM classifier.

TABLE 1

| | |
|---|---|
| S1 | It must be noticed that P.W .-1 in his deposition stated that the appellant had taken him away in an ambassador car driven by P.W.- 4 Rajib Bhuyan. |
| S2 | He further stated that the portion of the ground on which the grass was cut was shown to the Police Inspector. |
| S3 | The learned counsel stated that PWs 1, 2 and 3 must have come there to attack the appellants. |
| S4 | PW-15 further deposed that she knew Bharosa Colour Lab as she had been there several times to meet Mahesh. |

In an embodiment, the one or more processors 102 are configured at step 304 of 300, to train the denoising autoencoder to obtain an embedded representation of the one or more testimony sentences of the prior court cases. In order to perform step 304, the event structure (predicate-argument structure) of the one or more testimony sentences are leveraged. The embedded representation of the one or more testimony sentences are obtained using the trained denoising encoder. The training of the denoising encoder comprises of encoding the event structure of the one or more testimony sentences by masking either the predicate or one or more arguments of the event structure and reconstructing the embedded representation of the encoded event structure. The denoising encoder comprises an architecture where the input layer accepts a vector (of 900 dimensions) which is a concatenation of 300-dimensional pre-trained word vectors corresponding to predicate, A0 and A1, where any one of these is masked by using a zero vector. The next layer is a fully connected dense layer of 300 dimensions. Finally, the output layer is again a 900-dimensional layer reconstructing the original concatenated vector corresponding to the complete event structure. The trained denoising encoder is used for obtaining the embedded representation for the event structure of the one or more testimony sentences.

In an embodiment, the one or more processors 102 are configured at step 306 of 300 to store the embedded representation for the event structure of the one or more testimony sentences in a database in memory 104. The stored embedded representation of the event structure of the one or more testimony sentences are further used for ranking the relevant prior court cases for the user query. In order to perform step 404 of the method 400, the event structure (predicate-argument structure) of the user query and the one or more testimony sentences are leveraged. Table 2 shows an example of predicate-argument structures in PropBank style.

TABLE 2

S1: P.W. 1 to 5 have stated that the appellant assaulted the deceased with a crowbar on his head.
Predicate: assaulted, A0 (agent): the appellant, A1(patient/theme): the deceased
Q1: Which are the cases where the appellant has attacked the deceased?
Predicate: attacked, A0 (agent): the appellant, A1 (patient/theme): the deceased In the Table 2 A0 is an argument which plays an agent semantic role and A1 plays a patient/theme semantic role. S1 is a sentence (testimony or non-testimony sentence) and Q1 is the user query. In conventional state-of-the-art methods for finding exact match of predicate and arguments in a query event structure and sentence event structure will not give good results. These methods will not provide good results for semantically similar words. In our aforementioned example in Table 2, the semantic similarity between Q1 and S1 is not realized when the state-of-the-art methods are used, even though attacked and assaulted share the same semantic context. Henceforth, in the present disclosure method 400 an embedded representation for the event structure of the user query and the one or more testimony sentences is used for determining the semantic similarity. The embedded representation of the user query is obtained using the trained denoising encoder.

In an embodiment of the present disclosure, the one or more processors 102 are configured to estimate at step 406, a similarity between the obtained embedded representation of the user query and the embedded representation of each of the one or more testimony sentences using a similarity function. The similarity calculation may be represented as shown in Equation (1), $$SIM(Q,D)=\max_s cosine\_sim(Repr(Q),Repr(S)) \quad (1)$$

where Repr(x) is an embedded representation of structure x, D is the prior court case document and S are all testimony sentences in D.

In an embodiment of the present disclosure, the one or more processors 102 are configured to assign at step 408, a relevance score, to the one or more prior court cases associated with the one or more testimony sentences in accordance with the estimated similarity. The maximum value of cosine similarity between the embedded representations of the user query and the one or more testimony sentences of the prior court cases are considered for assigning the relevance score for SIM(Q,D).

In an embodiment of the present disclosure, the one or more processors 102 are configured to retrieve at step 410, a predefined number of prior court cases out of the one or more prior court cases, wherein the predefined number is decided based on the assigned relevance score. The prior court cases are sorted in descending order based on the relevance score. The predefined number of sorted prior court cases are retrieved as relevant prior court cases corresponding to the user query.

EXPERIMENTAL RESULTS

Dataset: Corpus: The Indian Supreme Court judgements from years 1952 to 2012 freely available at http://liiofindia.org/in/cases/cen/INSC/. There are 30,034 files containing 4,634,075 sentences and 134,329,128 tokens.

Queries: 10 queries, shown in Table 3, are selected each different such as, domestic violence, homicide, forgery, corruption and so on.

Ground Truth: As there is no publicly available ground truth for the queries, a standard pooling technique (Manning et al., 2010) is used for selection of candidate documents for annotation. Several ranking models (including our own techniques) are executed and top 20 documents is selected for each model to form a pool which is annotated manually.

The baseline techniques used for comparing the results obtained from the disclosed method are BM25, Doc2Vec, Sentence-BERT. The baseline method Sentence-BERT used state-of-the-art pretrained model bert-base-nli-stsb-mean-tokens to obtain sentence embeddings for sentences in both the user query and prior court cases.

The baseline methods and the disclosed method were evaluated in Information Retrieval (IR) evaluation setup consisting of the corpus, the queries and the ground truth. The considered evaluation measures are,
Average Precision (AP): This incorporates the relative ranking order of relevant documents; combines the joint effect of Precision and Recall.
R-Precision (R-Prec): R-precision is the proportion of the top-R retrieved documents that are relevant, where R is the number of relevant documents for the current query.

The retrieval performance of the disclosed method is compared with the baseline methods and an exact semantic match method. The comparison is showed in Table 3 and Table 4 below wherein B1 is BM25, B2 is Doc2Vec, B3 is Sentence-BERT, M1 is the exact semantic match method and M2 is the disclosed method.

TABLE 3

| User Query | R-Prec | | | | |
| --- | --- | --- | --- | --- | --- |
| | B1 | B2 | B3 | M1 | M2 |
| q1: a husband has set his wife on fire? | 0.13 | 0.00 | 0.50 | 0.63 | 0.63 |
| q2: the appellant has attacked the deceased? | 0.21 | 0.10 | 0.24 | 0.28 | 0.45 |
| q3: the respondent killed the deceased? | 0.00 | 0.00 | 0.0 | 1.00 | 1.00 |
| q4: the appellant demanded money? | 0.06 | 0.13 | 0.0 | 0.56 | 0.75 |
| q5: the respondent has forged signatures? | 0.00 | 0.00 | 0.25 | 0.75 | 0.75 |
| q6: the appellant accepted bribe? | 0.00 | 0.00 | 0.17 | 0.33 | 0.50 |
| q7: an appointment was challenged? | 0.14 | 0.14 | 0.00 | 0.43 | 0.57 |
| q8: an election was challenged? | 0.08 | 0.31 | 0.08 | 0.38 | 0.46 |
| q9: the complainant was beaten by wife? | 0.00 | 0.00 | 1.00 | 1.00 | 1.00 |
| q10: the respondent has admitted the charge? | 0.00 | 0.00 | 0.00 | 1.00 | 1.00 |
| Average over all queries | 0.06 | 0.07 | 0.22 | 0.64 | 0.71 |

TABLE 4

| User Query | AP | | | | |
| --- | --- | --- | --- | --- | --- |
| | B1 | B2 | B3 | M1 | M2 |
| q1: a husband has set his wife on fire? | 0.13 | 0.00 | 0.54 | 0.70 | 0.89 |
| q2: the appellant has attacked the deceased? | 0.10 | 0.06 | 0.09 | 0.28 | 0.51 |
| q3: the respondent killed the deceased? | 0.00 | 0.00 | 0.17 | 1.00 | 1.00 |
| q4: the appellant demanded money? | 0.03 | 0.07 | 0.02 | 0.56 | 0.76 |
| q5: the respondent has forged signatures? | 0.05 | 0.00 | 0.17 | 0.95 | 0.62 |
| q6: the appellant accepted bribe? | 0.02 | 0.00 | 0.10 | 0.33 | 0.43 |
| q7: an appointment was challenged? | 0.04 | 0.05 | 0.00 | 0.43 | 0.63 |
| q8: an election was challenged? | 0.01 | 0.15 | 0.04 | 0.38 | 0.50 |
| q9: the complainant was beaten by wife? | 0.00 | 0.00 | 1.00 | 1.00 | 1.00 |
| q10: the respondent has admitted the charge? | 0.00 | 0.00 | 0.00 | 1.00 | 1.00 |
| Average over all queries | 0.04 | 0.03 | 0.21 | 0.66 | 0.73 |

The disclosed methods M2 in Table 3 and Table 4 outperform the baseline methods for all the queries and in both the evaluation measures, by a considerable margin. To evaluate the contribution of testimony sentences, complete prior court cases are considered for BM25 as against only testimony sentences. BM25 could not find even a single relevant prior court case within top 10 for all the queries, highlighting the need for focusing only on testimony sentences. Hence, all the experiments are run considering only the testimony sentences. To evaluate the contribution of the Bi-LSTM based classifier, the disclosed method M2 was applied using only those testimony sentences identified by the linguistic rules. It is observed that the AP of M2 reduced from 0.73 to 0.69, stressing the importance of additional testimony sentences identified by the Bi-LSTM classifier. In the disclosed method, semantic roles are used that capture an event expressed in a query. For example, in the query q1 (in Table 3 and Table 4), the predicate-arguments are: Predicate: set, A0: husband, A1: wife which semantically captures an event and matches it with a prior court case where a similar event has occurred, a husband has poured kerosene on his wife and set her on fire, based on the similarity of the semantic argument structure. The baseline methods are unable to capture such nuanced semantic representations of the underlying events in a query. M2 helps in retrieving documents even if there is no exact match of the argument values in a query.

The written description describes the subject matter herein to enable any person skilled in the art to make and use the embodiments. The scope of the subject matter embodiments is defined herein and may include other modifications that occur to those skilled in the art. Such other modifications are intended to be within the scope of the present disclosure if they have similar elements that do not differ from the literal language of the present disclosure or if they include equivalent elements with insubstantial differences from the literal language of the embodiments described herein.

The embodiments of present disclosure herein provide a method for retrieval of prior court cases from testimony sentences. The method identifies testimony sentences from the prior court cases using a trained Bi-LSTM classifier and a set of linguistic rules. Further the method herein obtains an embedded representation for the event structure of the user query and the identified testimony sentences. A similarity is estimated between the embedded representation for the event structure of the user query and the prior court cases associated with the testimony sentences. Further a relevance score is assigned in accordance with the similarity function to retrieve the relevant prior court cases.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method for retrieving one or more prior court cases using witness testimonies, the method comprising:

receiving, via one or more hardware processors, a user query for retrieving one or more prior court cases, wherein the one or more prior court cases comprise a set of testimony sentences and a set of non-testimony sentences, wherein the user query and each testimony sentence of the set of testimony sentences comprise an event structure with a predicate and one or more arguments;

obtaining an embedded representation for the event structure of the user query, using a trained denoising auto-encoder executed via the one or more hardware processors, wherein the denoising auto-encoder is trained using one or more testimony sentences from the set of testimony sentences wherein the one or more testimony sentences are identified using a trained classifier and a set of linguistic rules, wherein the trained classifier is trained using a set of training data, wherein the set of training data comprises of (i) the set of testimony sentences satisfying a set of predefined linguistic rules, (ii) the set of non-testimony sentences satisfying a subset of the set of predefined linguistic rules and (iii) a set of sentences which are neither identified as testimony nor non-testimony by the linguistic rules and wherein the set of predefined linguistic rules satisfied by the set of testimony sentences are:

(i) presence of explicit or implicit witness mentions wherein the implicit mentions is any one of (a) pronouns (b) person-indicating common nouns (c) actual person names, (ii) presence of at least one statement-indicating verb, (iii) dependency subtree rooted at the at least one statement indicating verb should contain at least one of the following: a clausal complement or open clausal complement, (iv) the statement verb should not have a child which negates itself, and (v) the statement verb should have at least one witness mention within its subject or agent dependency subtree but should not have any legal role mention within its subject or agent dependency subtree;

estimating, via the one or more hardware processors, a similarity between the obtained embedded representation of the user query and an embedded representation of each of the one or more testimony sentences using a similarity function;

assigning a relevance score, via the one or more hardware processors, to the one or more prior court cases associated with the one or more testimony sentences in accordance with the estimated similarity; and retrieving a predefined number of prior court cases out of the one or more prior court cases, wherein the predefined number is decided based on the assigned relevance score.

2. The processor implemented method as claimed in claim 1 further comprising training the denoising auto-encoder, the training comprising:
(i) encoding the event structure by masking either the predicate or one or more arguments of the event structure of each of the one or more testimony sentences;
(ii) reconstructing the embedded representation of the encoded event structure of each of the one or more testimony sentences; and
(iii) storing the embedded representation of each of the one or more testimony sentences in the database.

3. The processor implemented method as claimed in claim 1, wherein the similarity function is a maximum cosine similarity function between the embedded representation of the user query and the one or more testimony sentences.

4. The processor implemented method as claimed in claim 1, wherein the identified one or more testimony sentences and the one or more non-testimony sentences are stored in a database.

5. The processor implemented method as claimed in claim 1, wherein the subset of the set of predefined linguistic rules satisfied by the set of non-testimony sentences are (i) presence of at least one statement-indicating verb, (ii) dependency subtree rooted at the at least one statement indicating verb should contain at least one of the following: a clausal complement or open clausal complement, (iii) the statement verb should have at least one legal role mention within its subject or agent dependency subtree.

6. A system (100), comprising:
a memory (104) storing instructions;
one or more communication interfaces (106); and
one or more hardware processors (102) coupled to the memory (104) via the one or more communication interfaces (106), wherein the one or more hardware processors (102) are configured by the instructions to:
receive a user query for retrieving one or more prior court cases, wherein the one or more prior court cases comprise a set of testimony sentences and a set of non-testimony sentences, wherein the user query and each testimony sentence of the set of testimony sentences comprise an event structure with a predicate and one or more arguments;
obtain an embedded representation for the event structure of the user query, using a trained denoising auto-encoder, wherein the denoising auto-encoder is trained using one or more testimony sentences from the set of testimony sentences wherein the one or more testimony sentences are identified using a trained classifier and a set of linguistic rules, wherein the trained classifier is trained using a set of training data, wherein the set of training data comprises of (i) the set of testimony sentences satisfying a set of predefined linguistic rules,
(ii) the set of non-testimony sentences satisfying a subset of the set of predefined linguistic rules and
(iii) a set of sentences which are neither identified as testimony nor non-testimony by the linguistic rules and
wherein the set of predefined linguistic rules satisfied by the set of testimony sentences are:
(i) presence of explicit or implicit witness mentions wherein the implicit mentions is any one of (a) pronouns (b) person-indicating common nouns (c) actual person names,
(ii) presence of at least one statement-indicating verb,
(iii) dependency subtree rooted at the at least one statement indicating verb should contain at least one of the following: a clausal complement or open clausal complement,
(iv) the statement verb should not have a child which negates itself, and
(v) the statement verb should have at least one witness mention within its subject or agent dependency subtree but should not have any legal role mention within its subject or agent dependency subtree;
estimate a similarity between the obtained embedded representation of the user query and an embedded representation of each of the one or more testimony sentences using a similarity function;
assign a relevance score to the one or more prior court cases associated with the one or more testimony sentences in accordance with the estimated similarity; and
retrieve a predefined number of prior court cases out of the one or more prior court cases, wherein the predefined number is decided based on the assigned relevance score.

7. The system of claim 6, further comprising training the denoising auto-encoder, the training comprising:
(i) encoding the event structure by masking either the predicate or one or more arguments of the event structure of each of the one or more testimony sentences;
(ii) reconstructing the embedded representation of the encoded event structure of each of the one or more testimony sentences; and
(iii) storing the embedded representation of each of the one or more testimony sentences in the database.

8. The system of claim 6, wherein the similarity function is a maximum cosine similarity function between the embedded representation of the user query and the one or more testimony sentences.

9. The system of claim 6, wherein the identified one or more testimony sentences and the one or more non-testimony sentences are stored in a database.

10. The system of claim 6, wherein the subset of the set of predefined linguistic rules satisfied by the set of non-testimony sentences are (i) presence of at least one statement-indicating verb, (ii) dependency subtree rooted at the at least one statement indicating verb should contain at least one of the following: a clausal complement or open clausal complement, (iii) the statement verb should have at least one legal role mention within its subject or agent dependency subtree.

11. One or more non-transitory machine readable information storage mediums comprising one or more instructions, which when executed by one or more hardware processors causes a method for:

receiving a user query for retrieving one or more prior court cases, wherein the one or more prior court cases comprise a set of testimony sentences and a set of non-testimony sentences, wherein the user query and each testimony sentence of the set of testimony sentences comprise an event structure with a predicate and one or more arguments;

obtaining an embedded representation for the event structure of the user query, using a trained denoising auto-encoder wherein the denoising auto-encoder is trained using one or more testimony sentences from the set of testimony sentences wherein the one or more testimony sentences are identified using a trained classifier and a set of linguistic rules, wherein the trained classifier is trained using a set of training data, wherein the set of training data comprises of (i) the set of testimony sentences satisfying a set of predefined linguistic rules, (ii) the set of non-testimony sentences satisfying a subset of the set of predefined linguistic rules and (iii) a set of sentences which are neither identified as testimony nor non-testimony by the linguistic rules and wherein the set of predefined linguistic rules satisfied by the set of testimony sentences are:

(i) presence of explicit or implicit witness mentions wherein the implicit mentions is any one of (a) pronouns (b) person-indicating common nouns (c) actual person names, (ii) presence of at least one statement-indicating verb, (iii) dependency subtree rooted at the at least one statement indicating verb should contain at least one of the following: a clausal complement or open clausal complement, (iv) the statement verb should not have a child which negates itself, and (v) the statement verb should have at least one witness mention within its subject or agent dependency subtree but should not have any legal role mention within its subject or agent dependency subtree;

estimating a similarity between the obtained embedded representation of the user query and an embedded representation of each of the one or more testimony sentences using a similarity function;

assigning a relevance score to the one or more prior court cases associated with the one or more testimony sentences in accordance with the estimated similarity; and retrieving a predefined number of prior court cases out of the one or more prior court cases, wherein the predefined number is decided based on the assigned relevance score.

* * * * *